(12) United States Patent
Maehata et al.

(10) Patent No.: US 6,271,492 B1
(45) Date of Patent: Aug. 7, 2001

(54) FRICTIONAL CHARGING DEVICE

(75) Inventors: Hidehiko Maehata; Tetsuya Inoue; Masanori Tsukahara; Daisuke Tamakoshi, all of Osaka (JP)

(73) Assignee: Hitachi Zosen Corporation (JP)

( * ) Notice: Subject to any disclaimer, the term of this patent is extended or adjusted under 35 U.S.C. 154(b) by 0 days.

(21) Appl. No.: 09/582,514
(22) PCT Filed: Nov. 1, 1999
(86) PCT No.: PCT/JP99/06088
§ 371 Date: Jul. 27, 2000
§ 102(e) Date: Jul. 27, 2000
(87) PCT Pub. No.: WO00/27535
PCT Pub. Date: May 18, 2000

(30) Foreign Application Priority Data

Nov. 5, 1998 (JP) .................................................. 10-313831
Nov. 13, 1998 (JP) .................................................. 10-322728

(51) Int. Cl.[7] ...................................................... B03L 7/00
(52) U.S. Cl. ........................................ 209/127.1; 209/128
(58) Field of Search ................................. 209/127.1, 128, 209/129, 130, 127.3, 127.4

(56) References Cited

U.S. PATENT DOCUMENTS

| | | | | |
|---|---|---|---|---|
| 2,737,348 | * | 3/1956 | Roberts | 241/24 |
| 5,289,922 | * | 3/1994 | Inculet et al. | 209/127.1 |
| 5,746,320 | * | 5/1998 | Fujita et al. | 209/127.3 |
| 6,034,342 | * | 3/2000 | Schmoutziguer et al. | 209/127.1 |

FOREIGN PATENT DOCUMENTS

| | | | |
|---|---|---|---|
| 09299829-A | * | 11/1997 | (JP) . |
| 09299830-A | * | 11/1997 | (JP) . |
| 20061357-A | * | 2/2000 | (JP) . |
| 2000126650-A | * | 5/2000 | (JP) . |
| 2000210589-A | * | 5/2000 | (JP) . |

* cited by examiner

Primary Examiner—Donald P. Walsh
Assistant Examiner—David A. Jones
(74) Attorney, Agent, or Firm—Mark Kusner

(57) ABSTRACT

A frictional charging device (30) for charging crushed chips (1) of a plurality of kinds of plastics by stirring them. A stirring vessel (31) has a friction assisting material (52) put therein, the particles of the friction assisting material (52) being so formed that they are larger than the plastic chips (1). A delivery port (34) formed in one end of the stirring vessel (31) is provided with a plurality of delivery area wires (47) arranged at predetermined intervals and parallel to each other. The spacing between adjacent delivery area wires (47) is set larger than the plastic chips (1) and smaller than the particles of the friction assisting material (52).

8 Claims, 15 Drawing Sheets

FRICTIONAL CHARGING DEVICE

TECHNICAL FIELD

The present invention relates to a frictional charging device that charges crushed chips of a plurality of kinds of plastics and feeds them to an electrostatic separator used for sorting.

BACKGROUND ART

In recent years, recycling of waste refuse has advanced rapidly. In this connection, plastics consumed as raw material for plastic products are thought to be mostly vinyl chloride type resin (hereinafter referred to as PVC), polyethylene type resin (hereinafter referred to as PE), and polypropylene type resin (hereinafter referred to as PP) and polystyrene type resin (hereinafter referred to as PS) and it is thought that waste plastics that are collected are mostly the aforesaid resins. And when these resins are to be recycled, it is necessary to sort the resins according to kind.

A method for sorting a mixture of chips of said kinds of plastics will now be described with reference to FIG. 14.

That is, there is a technique in which first, crushed chips 1 of a plurality of kinds of plastics are charged in a frictional charging device 2. Thereafter, the charged plastic chips 1 are fed from the frictional charging device 2 to an electrostatic separator 3 used for sorting, where particular plastic chips 1 are separated.

Said frictional charging device 2 is in the form of a cylindrical vessel 5 having a loading port 6 formed at one end thereof and a delivery port 7 at the other end. Rotatable stirring vanes (not shown) are installed in said cylindrical vessel 5, and a loading hopper 8 is installed at said loading port 6.

Further, said electrostatic separator 3 comprises a metal drum electrode 10 rotatable around a horizontal axis in a predetermined direction, and an arcuate opposed electrode plate 11 extending in the direction of rotation of the metal drum electrode 10 and disposed obliquely above and opposed to the latter. The opposed electrode plate 11 has a negative output of a high voltage source 12 connected thereto, while a positive output of the high voltage source 12 is grounded. As a result of this connection, a rotary grounded electrode is formed on the metal drum electrode 10 and a sorting electrostatic field is formed between the metal drum electrode 10 and the opposed electrode plate 11.

Disposed below the metal drum electrode 10 are first and second upwardly opened separation vessels 13 and 14 arranged in the order mentioned as seen from upstream of the direction of rotation. Further, disposed on the outer periphery of the metal drum electrode 10 is a brush 15 for scraping off plastic chips 1 sticking to the peripheral surface of the metal drum electrode 10.

The function of the above arrangement will now be described.

The chips 1 of a plurality of kinds of plastics are loaded through the loading hopper 8 into the cylindrical vessel 5, where the chips 1 of said kinds of plastics are stirred to be rubbed against each other by the stirring vanes rotating therein, whereby they are frictionally charged. The plastic chips 1 thus charged are delivered from the delivery port 7 and fall onto the metal drum electrode 10. And the positively charged plastic chips 1 are repelled by the metal drum electrode 10 and drawn toward the opposed electrode plate 11 and fall into the first separation vessel 13. Further, the negatively charged plastic chips 1 are drawn toward the surface of the metal drum electrode 10 and either fall into the second separation vessel 14 with the rotation of the metal drum electrode 10 or are scraped off the surface of the metal drum electrode 10 by the brush 15 and thereby separated and fall into the second separation vessel 14.

In the aforesaid sorting of plastic chips 1, the following has been proposed in order to sort out particular plastic chips 1 with higher accuracy and recover them.

That is, in order that chips 1 of a particular kind of plastic to be sorted out and plastic chips 1 having a reverse polarity to that of said chips 1 of said particular kind of plastic, in the electrification rank for said kinds of plastics forming the chips 1, may be equal in proportion to each other, particles of either of said plastics should be put as a friction assisting material in the stirring vessel 5.

For example, if said kinds of plastics forming the chips 1 are PVC, PE, PP, PS, these plastics may be arranged in order of electrification rank as PS→PE→PP→PVC. Here, PS is on the positive side of the electrification rank and PVC is on the negative side of the rank. This shows that PS and PE, when electrified, have a greater amount of positive charge and that PP and PVC, when electrified, have a greater amount of negative charge. Therefore, in the case where, e.g., PVC is to be sorted out, if the amount of PVC is smaller than the total amount of PS and PE, particles of PVC are put as a friction assisting material in the cylindrical vessel 5 such that the amount of PVC is equal to the total amount of PS and PE that are on the positive side of the electrification rank and have a polarity reverse to that of PVC. Further, on the contrary, if the amount of PVC is larger than the total amount of PS and PE, particles of PS and PE that are on the positive side of the electrification rank and have a polarity reverse to that of PVC, are put as a friction assisting material in the cylindrical vessel 5. Thereby, PVC is sufficiently electrified in a short time to negative polarity, so that PVC can be sorted out with high accuracy in the electrostatic separator 3.

However, as described above, in the case where the friction assisting material has been put in the cylindrical vessel 5, the friction assisting material is also delivered through the delivery port 7 of the cylindrical vessel 5 together with the plastic chips 1, so that there is a problem that a special device is required to recover the delivered friction assisting material and put it back again into the cylindrical vessel 5.

As a means for solving the above problem, the following arrangement may be contemplated. That is, a friction assisting material 18 of larger particle size than that of plastic chips 1 is used and a net member 16 of orthogonal cross pattern is fixedly attached to the delivery portion 7 of the cylindrical vessel 5. As shown in FIGS. 15 and 16, the meshes 17 of this net member 16 are larger than the plastic chips 1 and smaller than the friction assisting material 18. The friction assisting material 18 is thus confined in the cylindrical vessel 5, whereby the friction assisting material 18 can be repetitively used.

In the conventional arrangement described above, however, as shown in FIG. 15, even if the meshes 17 of the net member 16 are made larger than the plastic chips 1, there occurs a problem that such plastic chips 1 are caught by the intersections between the mutually orthogonal wires 16a and 16b of the net member 16 and gradually clog the meshes 17 of the net member 16 until troubles occur in delivering the charged plastic chips 1 from the delivery port 7.

Further, as shown in FIG. 16, when plastic chips 1 are about to pass through the meshes 17 of the net member 16 for delivery from the delivery port 7, particles of the friction assisting material 18 traveling to a point just short of the net member 16 together with plastic chips 1 block up the meshes 17 of the net member 16, presenting a problem that delivery of plastic chips 1 becomes stagnant.

Accordingly, an object of the present invention is provide a frictional charging device wherein a friction assisting material is repetitively used, whereby particular plastic chips are fully charged in a short time and the charged plastic chips can be delivered without any trouble.

DISCLOSURE OF THE INVENTION

The present invention provides a frictional charging device that charges crushed chips of a plurality of kinds of plastics by stirring them and feeds them to an electrostatic separator used for sorting, said frictional charging device being characterized in that said device is provided with a stirring vessel rotatable around its axis, and a rotary driving device for rotating said stirring vessel, said stirring vessel having a loading port formed at one end thereof for loading plastic chips, said stirring vessel having a delivery port formed at the other end thereof for delivering charged plastic chips, said delivery port being provided with a plurality of delivery area wires arranged along the cross-section of the stirring vessel, at predetermined intervals and parallel to each other, wherein in order that chips of a particular kind of plastic to be sorted out and plastic chips having a positive or negative polarity reverse to that of said chips of said particular kind of plastic, in the electrification rank for said kinds of plastics forming the chips, may be equal in proportion to each other, particles of either of said plastics are put as a friction assisting material in the stirring vessel, the particles of said friction assisting material being so formed that they are larger than the plastic chips, the spacing between said delivery area wires being set larger than the plastic chips and smaller than the particles of the friction assisting material.

According to such arrangement, plastic chips loaded into the stirring vessel through the loading port gradually move within the stirring vessel toward the delivery port and, passing through between the delivery area wires, they are delivered through the delivery port. At this time, since the plastic chips are stirred in the stirring vessel, which is rotating, they are rubbed against each other and against the friction assisting material and fully frictionally charged in a short time.

Further, since the spacing between adjacent delivery area wires is set larger than the plastic chips and since these delivery area wires are not of net-like cross construction but are arranged parallel and in the same direction, the plastic chips reliably pass through between the delivery area wires without being caught by the delivery area wires and are delivered through the delivery port.

Further, since the spacing between adjacent delivery area wires is set smaller than the particles of the friction assisting material, the particles of the friction assisting material cannot pass through between the deliver area wires, so that they remain in the stirring vessel without being delivered through the delivery port. Thereby, the friction assisting material can be repetitively used.

Further, the invention provides a frictional charging device characterized in that disposed intermediate between the loading port and the delivery port are a plurality of intermediate wires arranged along the cross-section of the stirring vessel, at predetermined intervals and parallel to each other, the spacing between said intermediate wires being set larger than the plastic chips and smaller than the particles of the friction assisting material, the delivery area wires and the intermediate wires differing from each other in direction peripherally of the stirring vessel.

According to such arrangement, the plastic chips loaded into the stirring vessel, which is rotating, through the loading port gradually move within the stirring vessel toward the delivery port, passing through between the intermediate wires and then through between the delivery area wires, whereupon they are delivered through the delivery port.

Further, the invention provides a frictional charging device characterized in that the stirring vessel is inclined such that the delivery port side is positioned below the level of the loading port side.

According to such arrangement, the plastic chips loaded into the stirring vessel through the loading port gradually move toward the delivery port owing to the inclination of the stirring vessel, until they are reliably delivered through the delivery port with almost no plastic chips remaining in the stirring vessel.

Further, the invention provides a frictional charging device characterized by including a delivery area adjuster for adjusting the area of an opening in the delivery port.

According to such arrangement, the delivery rate of the plastic chips can be adjusted by increasing or decreasing the area of the opening in the delivery port by the delivery area adjuster.

Further, the invention provides a frictional charging device characterized by including a stirring member disposed in the stirring vessel for stirring the plastic chips.

According to such arrangement, the plastic chips loaded into the stirring vessel are fully stirred by the rotation of the stirring vessel and by the stirring member, during which stirring, the plastic chips are reliably rubbed against each other and against the friction assisting material.

Further, the invention provides a frictional charging device that charges crushed chips of a plurality of kinds of plastics by stirring them and feeds them to an electrostatic separator used for sorting, said frictional charging device being characterized in that an inner sleeve having a number of openings extending therethrough is rotatably installed inside an outer sleeve, said outer sleeve being provided with a loading port for loading plastic chips into the outer sleeve, and a delivery port for delivering the plastic chips, delivered from the inside of the inner sleeve, to the outside of the outer sleeve, wherein in order that chips of a particular kind of plastic to be sorted out and plastic chips having a reverse polarity to said chips of said particular kind of plastic, in the electrification rank for a plurality of kinds of plastics forming the chips, may be equal in proportion to each other, particles of either of said plastics are put as a friction assisting material in the inner sleeve, the particles of said friction assisting material being so formed that they are larger than the plastic chips, the openings in said inner sleeve being formed to be larger than the plastic chips and smaller than the particles of the friction assisting material.

According to such arrangement, the plastic chips loaded into the outer sleeve through the loading portion enter the inner sleeve, which is rotating, through the openings in the inner sleeve to be stirred therein. Therefore, the plastic chips are rubbed against each other and against the friction assisting material, so that they are fully frictionally charged in a short time.

The plastic chips thus charged move out of the inner sleeve through the openings to the outside of the inner sleeve, whereupon they are delivered through the delivery portion to the outside of the outer sleeve. Further, since the friction assisting material cannot pass through the openings in the inner sleeve, they remain in the inner sleeve. Thereby, the friction assisting material can be repetitively used.

The rotation of the inner sleeve causes the friction assisting material to roll on the inner peripheral surface of the inner sleeve, thereby preventing the friction assisting material clogging the openings in the inner sleeve. Therefore, the plastic chips reliably pass through the openings in the inner sleeve to be delivered out of the inner sleeve to the outside of the latter.

Further, the invention provides a frictional charging device characterized in that the inner sleeve is rotatable around a horizontal axis, the loading portion is formed in the upper region of the outer sleeve, while the delivery portion is formed in the lower region of the outer sleeve, and said inner sleeve is located at a vertical position between the loading portion and the delivery portion.

According to such arrangement, the plastic chips loaded into the outer sleeve through the loading portion, while falling, enters the inner sleeve, which is rotating, through the openings in the inner sleeve. Further, the plastic chips delivered to the outside of the inner sleeve through the openings in the inner sleeve, while falling, are delivered to the outside of the outer sleeve through the delivery portion. Thus, the utilization of the falling of the plastic chips in loading and delivering them ensures smooth loading and delivery of the plastic chips.

Further, the invention provides a frictional charging device characterized in that the inner sleeve is composed of an inner sleeve main body shaped like a sleeve, and end members for closing the opposite ends of said inner sleeve main body, and said inner sleeve main body and said end members are respectively formed with a number of openings.

According to such arrangement, since a number of openings are formed in the entire surface of the inner sleeve, the loading and delivery of the plastic chips are effected through the entire surface of the inner sleeve. Therefore, even if clogging of some openings should locally occur in the inner sleeve, the plastic chips pass through the other openings, so that almost no trouble occurs.

BEST MODE FOR EMBODYING THE INVENTION

Figure 1:
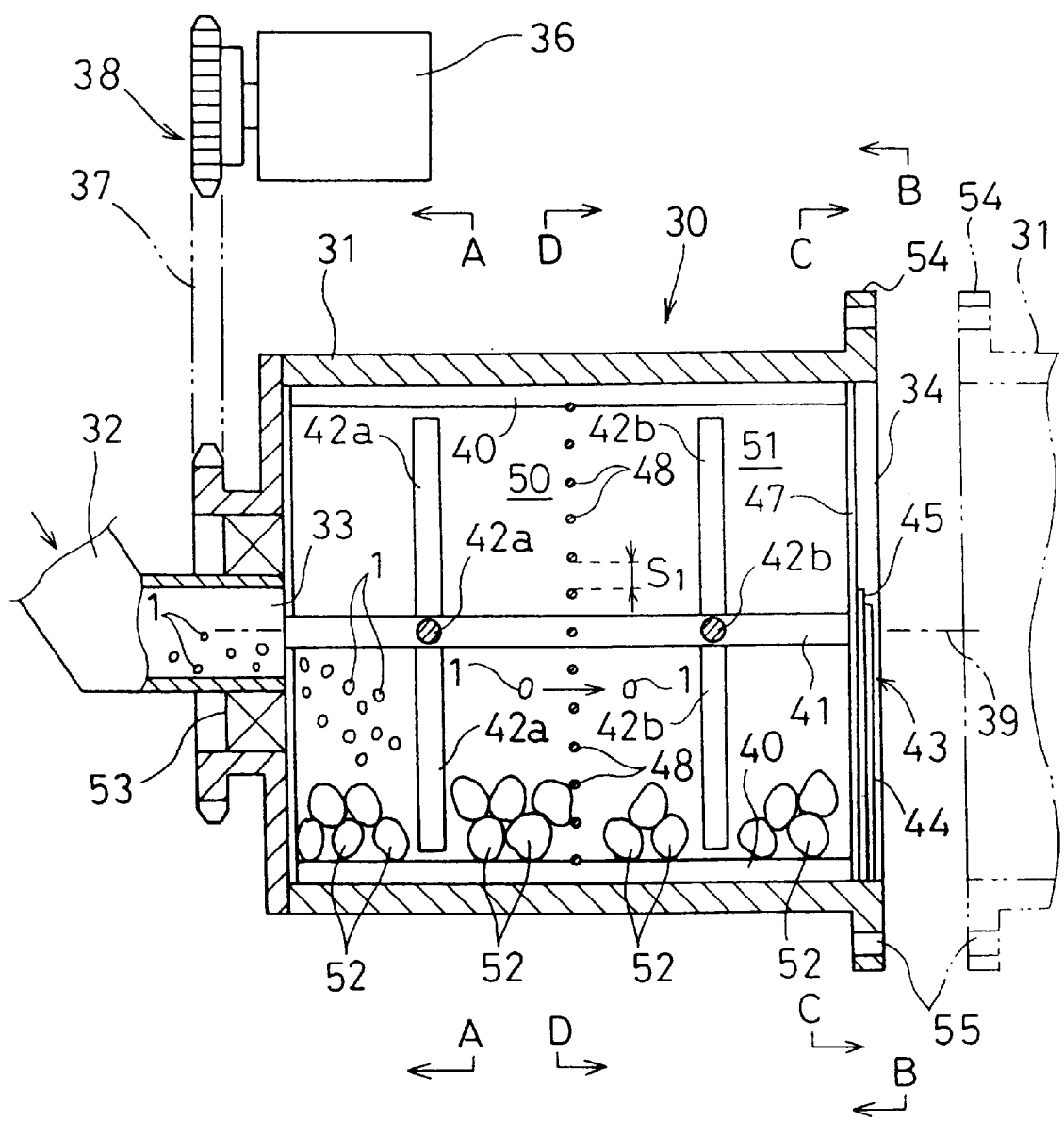
FIG. 1 is a longitudinal section of the stirring vessel of a frictional charging device according to an embodiment 1 of the present invention.

To give a detailed description of the invention, first, an embodiment 1 of the invention will be described with reference to FIGS. 1 through 7. In addition, since an electrostatic separator 3 has the same arrangement as the conventional one described above, like reference numerals are added to omit a description thereof.

Figure 2:
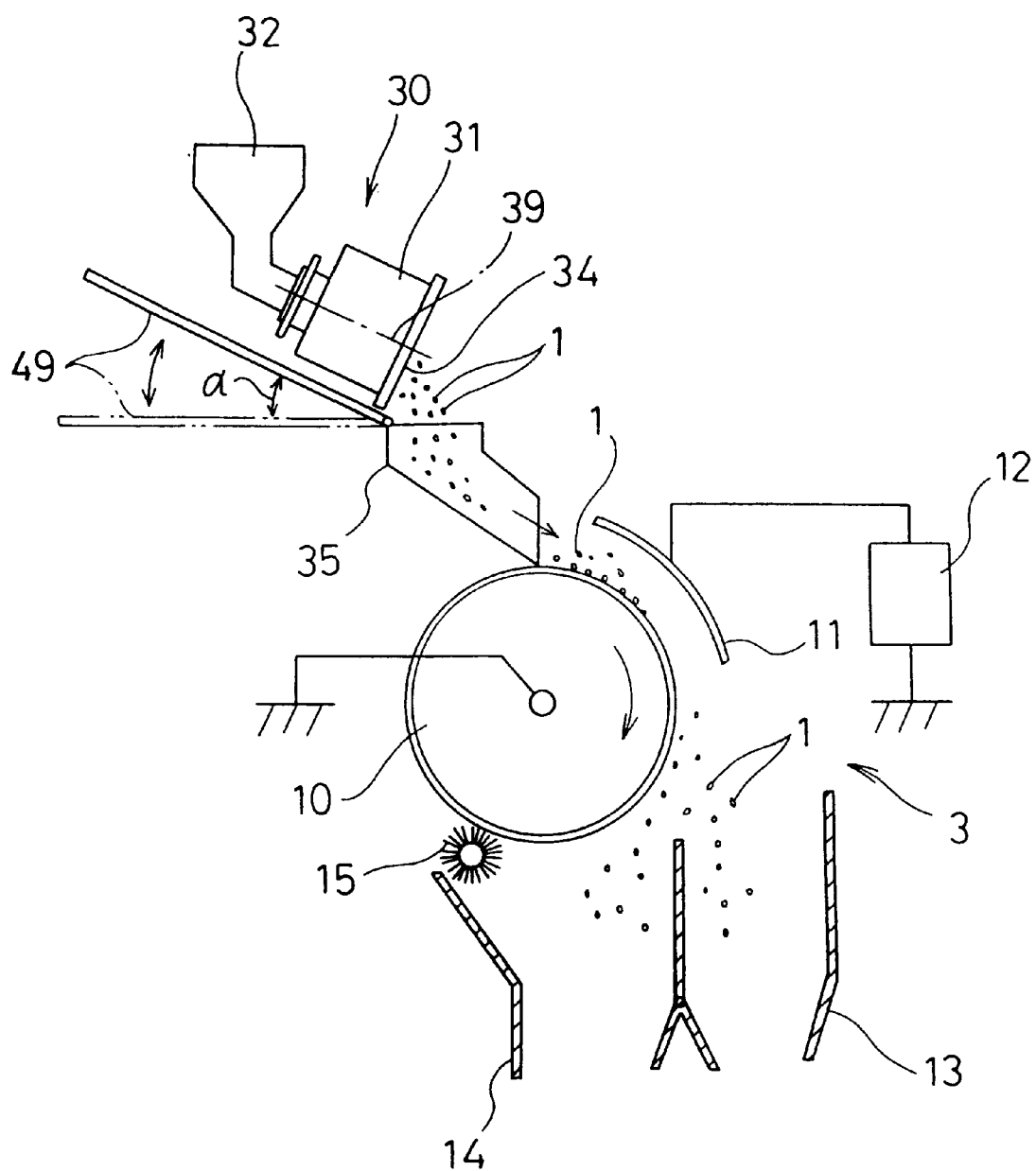
FIG. 2 is a view showing said frictional charging device and an electrostatic separator disposed downstream of said frictional charging device.

As shown in FIGS. 1 and 2, the numeral 30 denotes a frictional charging device for charging crushed plastic chips 1 by stirring them. This frictional charging device 30 comprises a cylindrical stirring vessel 31, and a loading hopper 32 for loading crushed plastic chips 1 into said stirring vessel 31.

One end of said stirring vessel 31 is formed with a loading port 33. Said loading port 33 has the lower portion of said loading hopper 32 connected thereto through a bearing 53. Further, the other end of the stirring vessel 31 is formed with a delivery port 34 for delivery of charged plastic chips 1. The plastic chips 1 delivered from said delivery port 34 slide inside and down a feed tray 35 and are fed onto a metal drum electrode 10 of the electrostatic separator 3.

Said stirring vessel 31 is turnably attached to a support frame 49 through bearings or the like (not shown) and is rotated around an axis 39 by a rotary driving device 38 composed of a motor 36 and a driving belt 37. Further, said support frame 49 is arranged for vertical turning motion around one end thereof and is turned as by a cylinder device (not shown). Thus, turning the support frame 49 changes the inclination angle α of the stirring vessel 31. At this time, the stirring vessel 31 is tilted such that its delivery port 34 is positioned below the level of its loading port 33.

Figure 3:
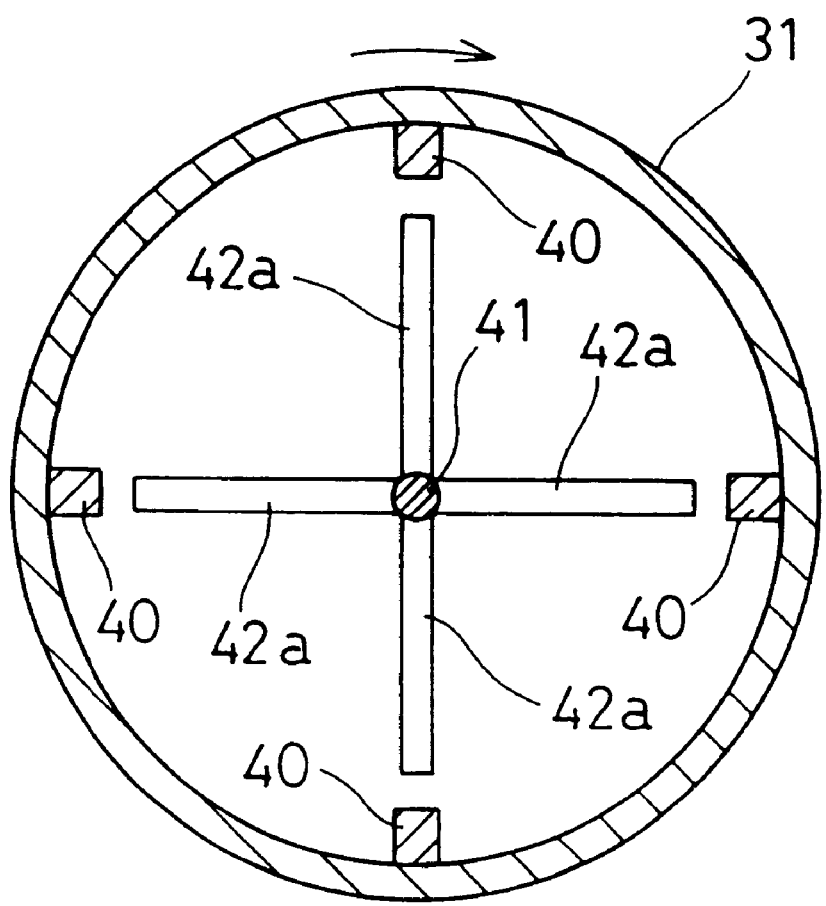
FIG. 3 is a view taken along the line A—A in FIG. 1.
Figure 4:
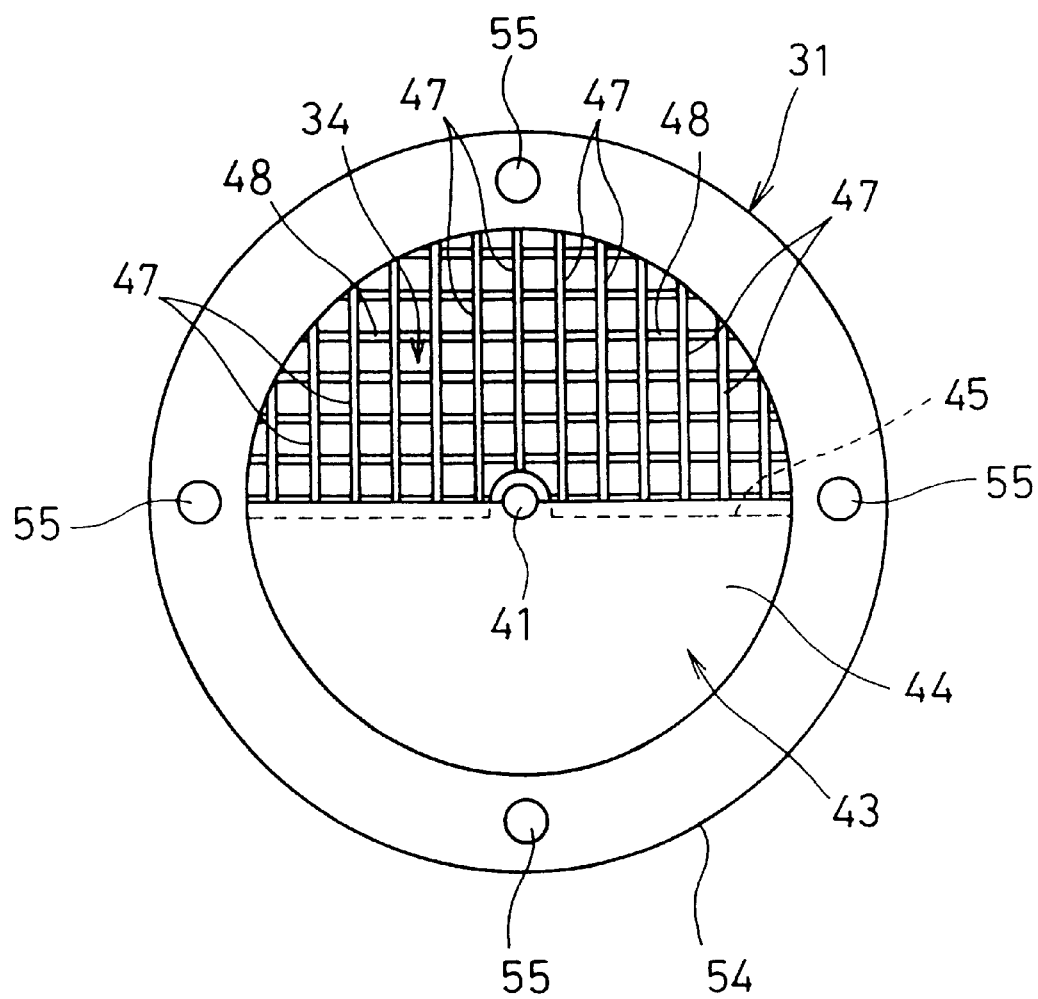
FIG. 4 is a view taken along the line B—B in FIG. 1.

Further, as shown in FIGS. 1 and 3, the inner peripheral surface of said stirring vessel 31 is provided with a plurality of stirring vanes 40 (an example of a stirring member) peripherally disposed at predetermined angular intervals and extending from the loading port 33 to the delivery port 34.

Further, the stirring vessel 31 is internally provided with a support shaft 41 extending along an axis 39. One end of said support shaft 41 is attached to the lower end of the loading hopper 32. Said support shaft 41 is provided with a plurality of stirring rods 42a, 42b (an example of a stirring member) extending radially outward from the axis 39 of the stirring vessel 31. In addition, one plurality of stirring rods 42a are positioned on the side of the loading port 33 in the stirring vessel 31. And the other plurality of stirring rods 42b are positioned closer to the delivery port 34 in the stirring vessel 31. Further, the stirring vessel 31 is a vessel that is made of metal or whose inner peripheral surface is coated with resin.

Figure 5:
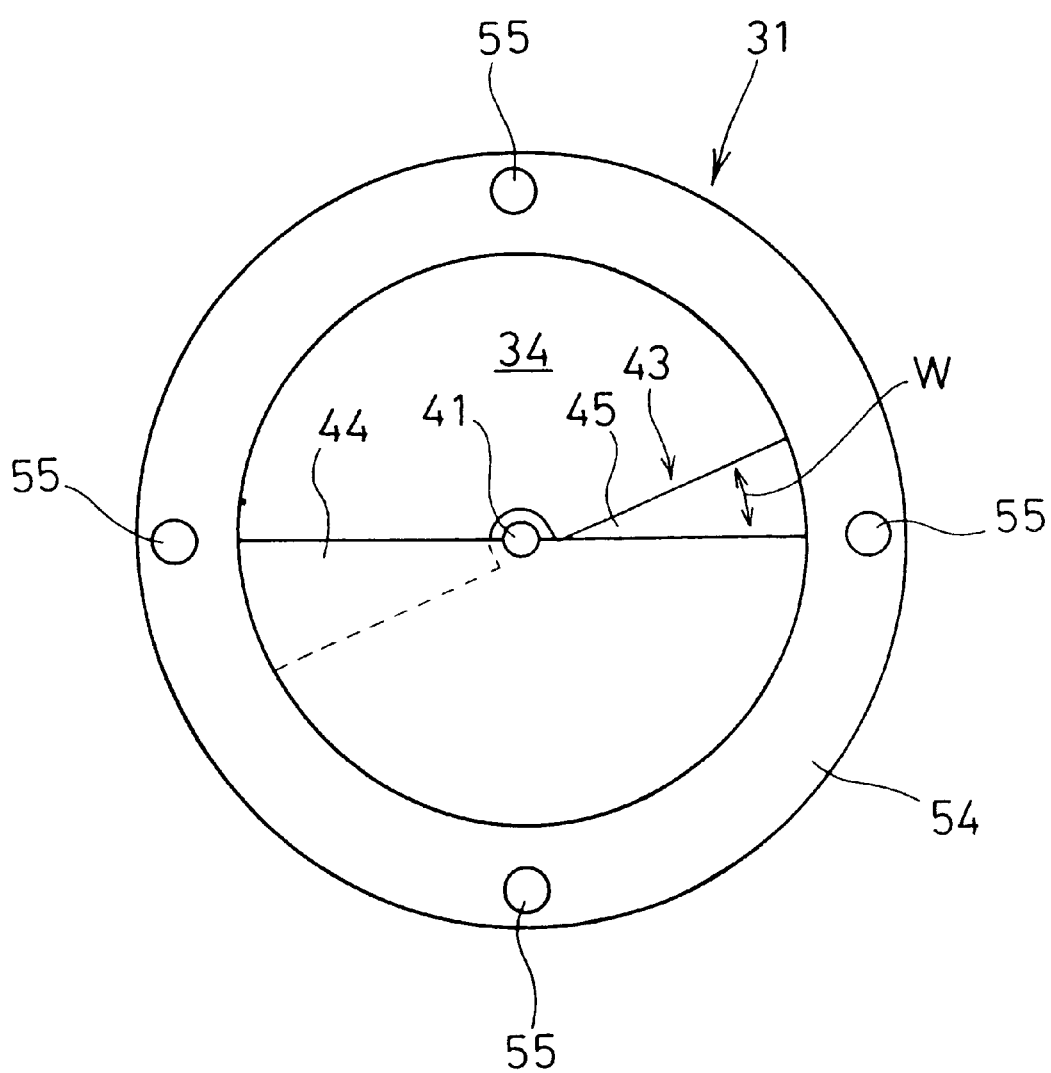
FIG. 5 is an enlarged view of the delivery area adjuster of said frictional charging device.

Further, as shown in FIGS. 1 and 5, the delivery port 34 is provided with a delivery area adjuster 43 for adjusting the area of the opening in the delivery port 34. That is, the delivery area adjuster 43 is composed of a semicircular fixed plate 44 covering substantially half the delivery port 34, and a semicircular movable plate 45 turnable around the axis 39 to overlap said fixed plate 44. The movable plate 45 is fitted on the other end of the support shaft 41 and is thereby supported.

Figure 6:
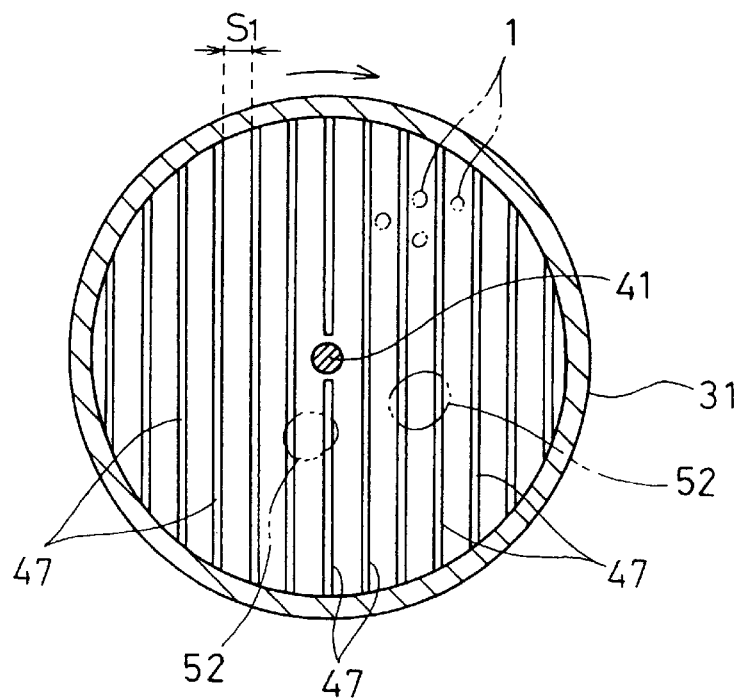
FIG. 6 is a view taken along the line C—C in FIG. 1.

Further, as shown in FIGS. 1 and 6, the delivery port 34 is provided with a plurality of delivery area wires 47 arranged along the cross-section of the stirring vessel 31 orthogonal to its axis 39, at predetermined intervals of $S_1$ and parallel to each other. These delivery area wires 47 are positioned inside the delivery area adjuster 43. The delivery area wires 47 are fixedly attached at their opposite ends to the inner peripheral surface of the stirring vessel 31.

Figure 7:
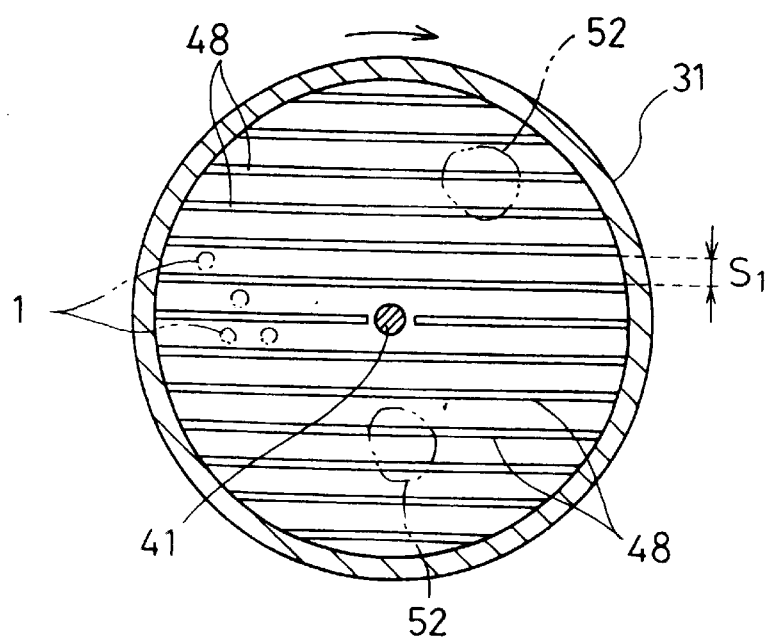
FIG. 7 is a view taken along the line D—D in FIG. 1.

Similarly, as shown in FIGS. 1 and 7, disposed intermediate between the loading port 33 and the delivery port 34 are a plurality of intermediate wires 48 arranged along the cross-section of the stirring vessel 31 orthogonal to its axis 39, at predetermined intervals of $S_1$ and parallel to each other. These intermediate wires 48 are fixedly attached at their opposite ends to the inner peripheral surface of the stirring vessel 31. And as shown in FIGS. 6 and 7, the respective directions of the delivery area wires 47 and intermediate wires 48 are shifted by 90° peripherally of the stirring vessel 31. As shown in FIG. 1, the stirring vessel 31 is internally divided at the intermediate wires 48 into a first stirring chamber 50 positioned on the side of the loading port 33 and a second stirring chamber 51 positioned on the side of the delivery port 34. In addition, said one plurality of stirring rods 42a are positioned in the first stirring chamber 50 and the other plurality of stirring rods 42b are positioned in the second stirring chamber 51.

Further, as shown in FIG. 1, in order that chips 1 of a particular kind of plastic to be sorted out and plastic chips 1 having a positive or negative polarity reverse to that of said chips 1 of said particular kind of plastic, in the electrification rank for said kinds of plastics forming the chips 1, may be equal in proportion to each other, particles of either of said plastics are put as a friction assisting material 52 in the stirring vessel 31. The particles of said friction assisting material 52 are larger than the chips 1 of said kinds of plastics. As shown in FIGS. 6 and 7, the spacing $S_1$ in each of said wires 47 and 48 is set larger than the plastic chips 1 and smaller than the particles of the friction assisting material 52.

For example, in the case of a mixture of chips 1 of said kinds of plastics such as PVC, PE, PP, PS, these plastics, when arranged in order of electrification rank, may be arranged in order of electrification rank as PS→PE→PP→PVC. Here, PS is on the positive side of the electrification rank and PVC is on the negative side of the rank. In the case where, e.g., PVC is to be sorted out, if the amount of PVC is smaller than the total amount of PS and PE, particles of PVC are put as a friction assisting material in the stirring vessel 31 such that the amount of PVC is equal to the total amount of PS and PE that have a reverse polarity to that of PVC. On the contrary, if the amount of PVC is larger than the total amount of PS and PE, particles of PS and PE that are on the positive side of the electrification rank and have a reverse polarity to that of PVC, are put as a friction assisting material 52 in the stirring vessel 31. Thus, since the amount of PVC is made equal to the total amount of PS and PE having a reverse polarity to that of PVC, PVC is sufficiently electrified in a short time to negative polarity, so that PVC can be sorted out with high accuracy in the electrostatic separator 3.

The friction assisting material 52 selected in the manner described above is put in the first and second stirring chambers 50 and 51 in the stirring vessel 31 and while the stirring vessel 31 is being rotated by the rotary driving device 38, crushed plastic chips 1 are loaded into the stirring vessel 31 through the loading hopper 32.

Thereby, the plastic chips 1 loaded into the first stirring chamber 50 through the loading port 33 gradually move within the inclined stirring vessel 31 toward the delivery port 34, passing through between the intermediate wires 48 into the second stirring chamber 51, then passing through between the delivery area wires 47, whereupon they are delivered through the delivery port 34. At this time, the plastic chips 1 in the stirring vessel 31 are reliably stirred by the stirring vanes 40 rotating with the stirring vessel 31 and by the stirring rods 42a and 42b stationary relative to the stirring vessel 31. Therefore, the plastic chips 1 are rubbed against each other and against the friction assisting material 52, so that they are fully frictionally charged in a short time.

In addition, as shown in FIG. 6, since the spacing $S_1$ between adjacent delivery area wires 47 is set larger than the plastic chips 1 and since these delivery area wires 47 are not of net-like cross construction but are arranged parallel and in the same direction, the plastic chips 1 reliably pass through between the delivery area wires 47 without being caught by the delivery area wires 47 and are delivered through the delivery port 34.

Further, since the spacing $S_1$ between adjacent delivery area wires 47 is set smaller than the particles of the friction assisting material 52, the particles of the friction assisting material 52 cannot pass through between the deliver area wires 47, so that they remain in the stirring vessel 31 without being delivered through the delivery port 34. Thereby, the friction assisting material 52 can be repetitively used.

In addition, as shown in FIG. 7, it is also possible for the intermediate wires 48 to provide the same function and effect as those provided by the delivery area wires 47.

Further, as shown in FIG. 5, since the area of the opening in the delivery port 34 can be increased or decreased by turning the movable plate 45 in the direction of arrow W, the delivery rate of the plastic chips 1 being delivered through the delivery port 34 can be adjusted. Further, the delivery rate of said plastic chips 1 can also be adjusted by the rpm of the stirring vessel 31, the angle of inclination α, or the wire diameter or the spacing $S_1$ of the wires 47, 48.

The plastic chips 1 thus delivered through the delivery port 34, fully charged, are fed as shown in FIG. 2 through the feed tray 35 onto the metal drum electrode 10 and sorted into two groups, one fed into the first separation vessels 13 and the other into the second separation vessel 14, according to kind.

In said embodiment 1, in the case of sorting, for example, PVC from the chips 1 of said kinds of plastics such as PVC, PE, PP and PS, particles of PVC or particles of PS and PE that are on the positive side of the electrification rank are used as the friction assisting material 52 according to the PVC content. However, the same effect may also be obtained by using particles of PP that is located intermediate in the electrification rank, as a friction assisting material 52. Further, particles of a metal such as stainless steel, may be used as the friction assisting material 52.

Further, as shown in FIG. 1, the other end of the stirring vessel 31 is provided with a flange 54, and the flange 54 is formed with a plurality of bolt holes 55 and is bolted to the flange 54 of another stirring vessel 31 shown in phantom lines; in this manner, two stirring vessels 31 can be joined together. This makes possible the frictional charging of a large amount of plastic chips 1. In this case, however, the delivery area adjuster 43 will be provided only in this separate, newly connected stirring vessel 31 shown in phantom lines and the delivery area adjuster 43 of the stirring vessel 31 shown in solid lines will be removed.

Further, in said embodiment 1, with the stirring vessel 31 inclined as shown in solid lines in FIG. 2, plastic chips 1 are loaded into the stirring vessel 31 for friction charging; however, with the stirring vessel 31 held horizontal, plastic chips 1 may be loaded into the stirring vessel 31 for frictional charging and after the lapse of a predetermined time when the plastic chips 1 have been fully frictionally charged, the stirring vessel 31 may be tilted to deliver the plastic chips 1 through the delivery port 34.

Further, in said embodiment 1, as shown in FIGS. 6 and 7, the respective directions of the delivery area wires 47 and intermediate wires 48 are shifted by 90° peripherally of the stirring vessel 31; however, they may be shifted by other angle than 90° or instead of shifting, said wires 47 and 48 may be arranged in the same direction.

An embodiment 2 of the invention will now be described with reference to FIGS. 8 through 12 of the accompanying drawings. In addition, since the electrostatic separator 3 is the same arrangement as the conventional one described above, like reference numerals are added to omit a description thereof.

Figure 8:
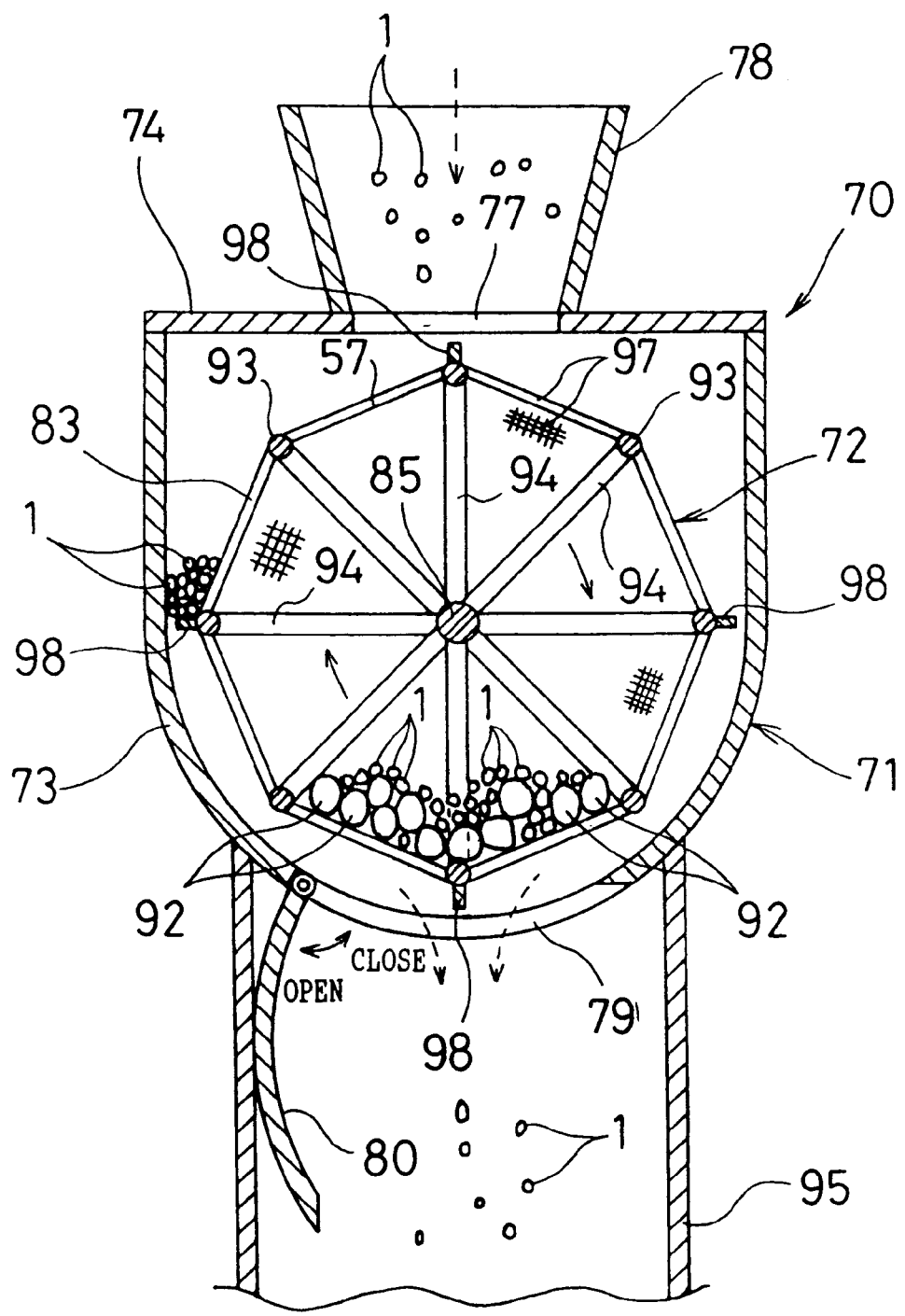
FIG. 8 is a front view, in section, of a frictional charging device according to an embodiment 2 of the invention.
Figure 9:
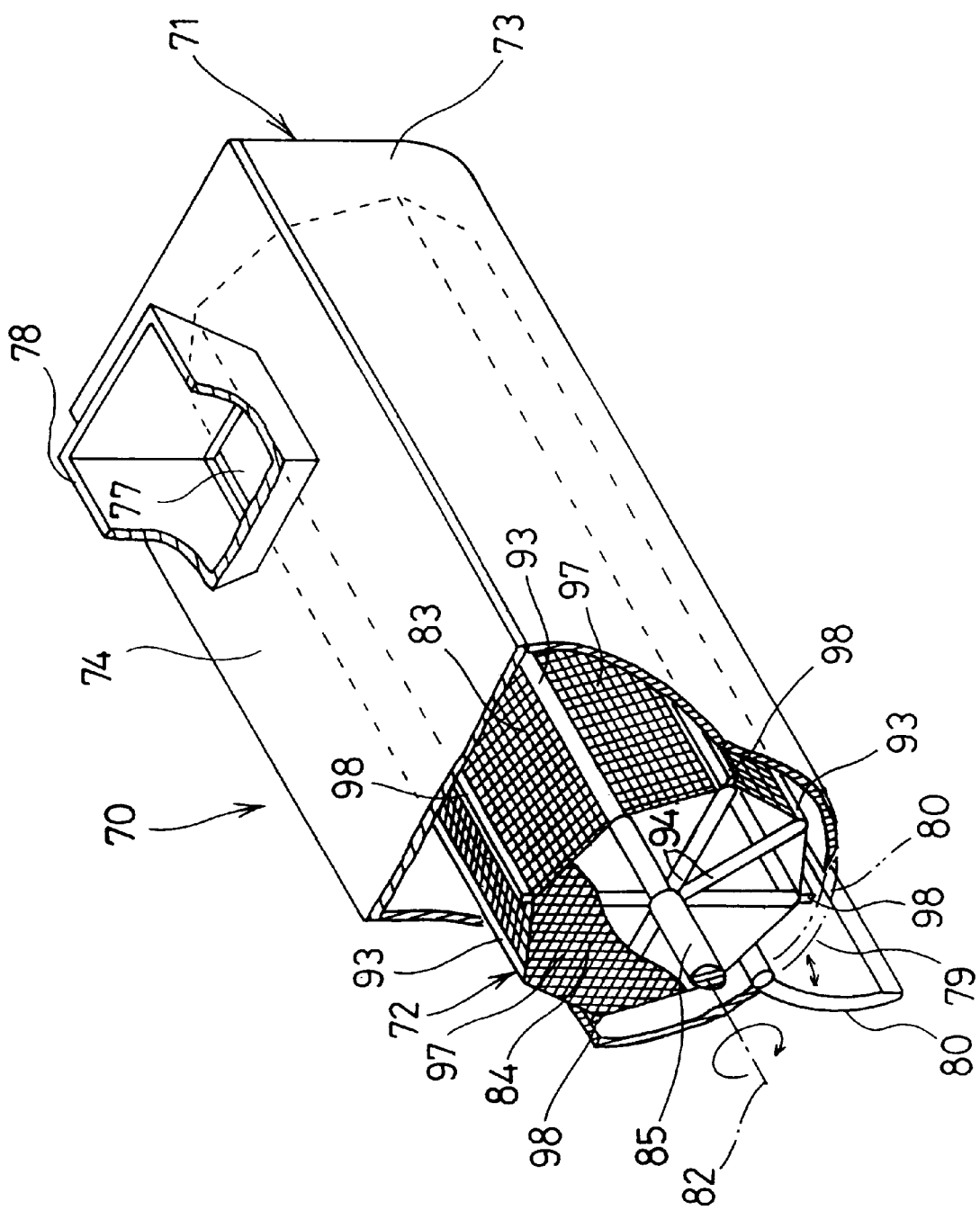
FIG. 9 is a perspective view, partly broken away, of said frictional charging device.
Figure 10:
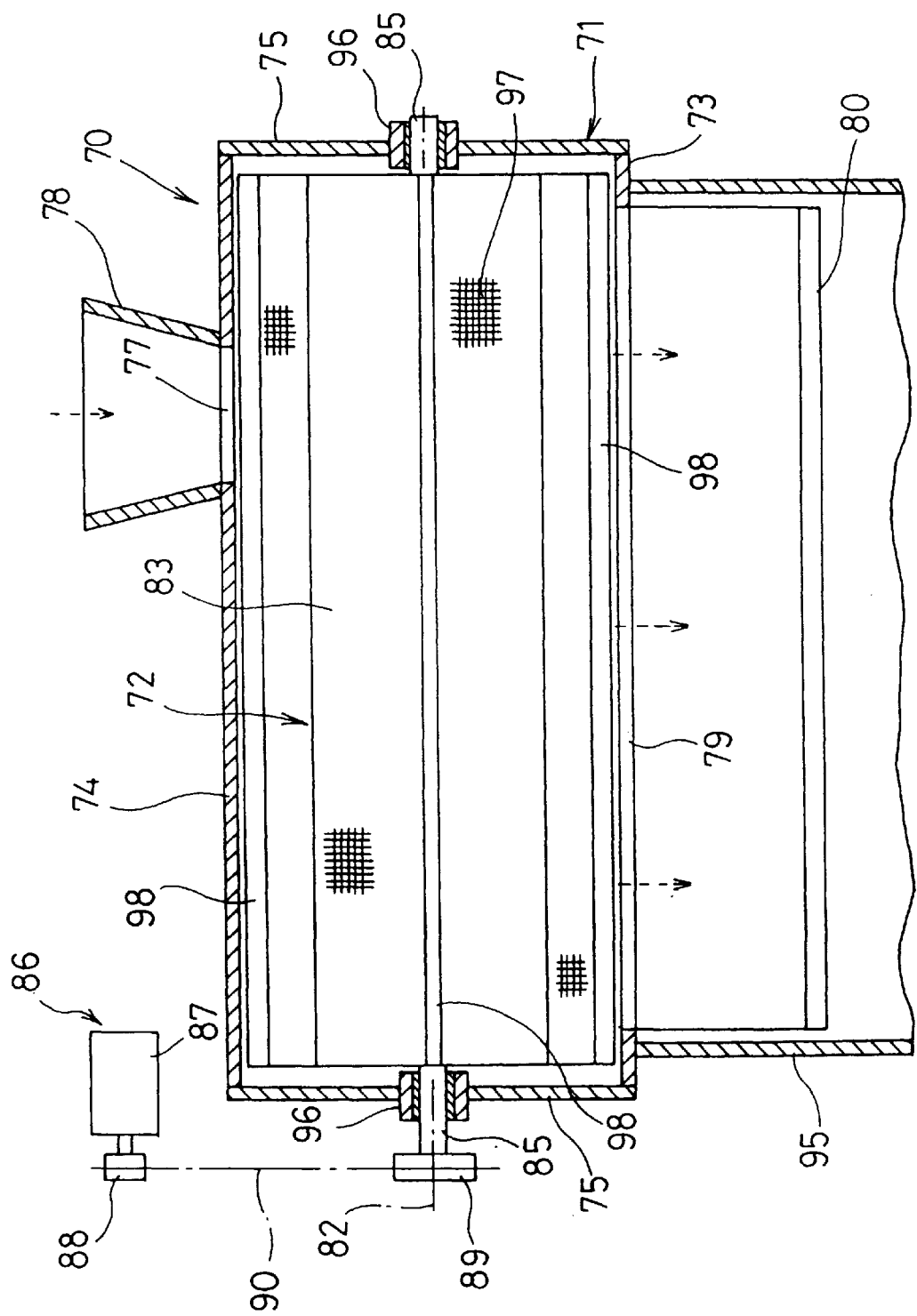
FIG. 10 is a side view, in section, of said frictional charging device.

As shown in FIGS. 8 through 10, the numeral 70 denotes a frictional charging device for charging a mixture of crushed chips 1 of a plurality of kinds of plastics by stirring them. This frictional charging device 70 comprises an outer sleeve 71 and an inner sleeve 72. The outer sleeve 71 is composed of an outer sleeve drum 73 U-shaped in a front view, a roof plate 74 disposed on top of the outer sleeve drum 73, and end plates 75 disposed on the front and rear ends of the outer sleeve drum 73 and is thus made hollow.

The roof plate 74 is formed with a loading port 77 (an example of a loading portion) for loading plastic chips 1 into the outer sleeve 71. The lower end of a loading hopper 78 is connected to this loading port 77.

Figure 12:
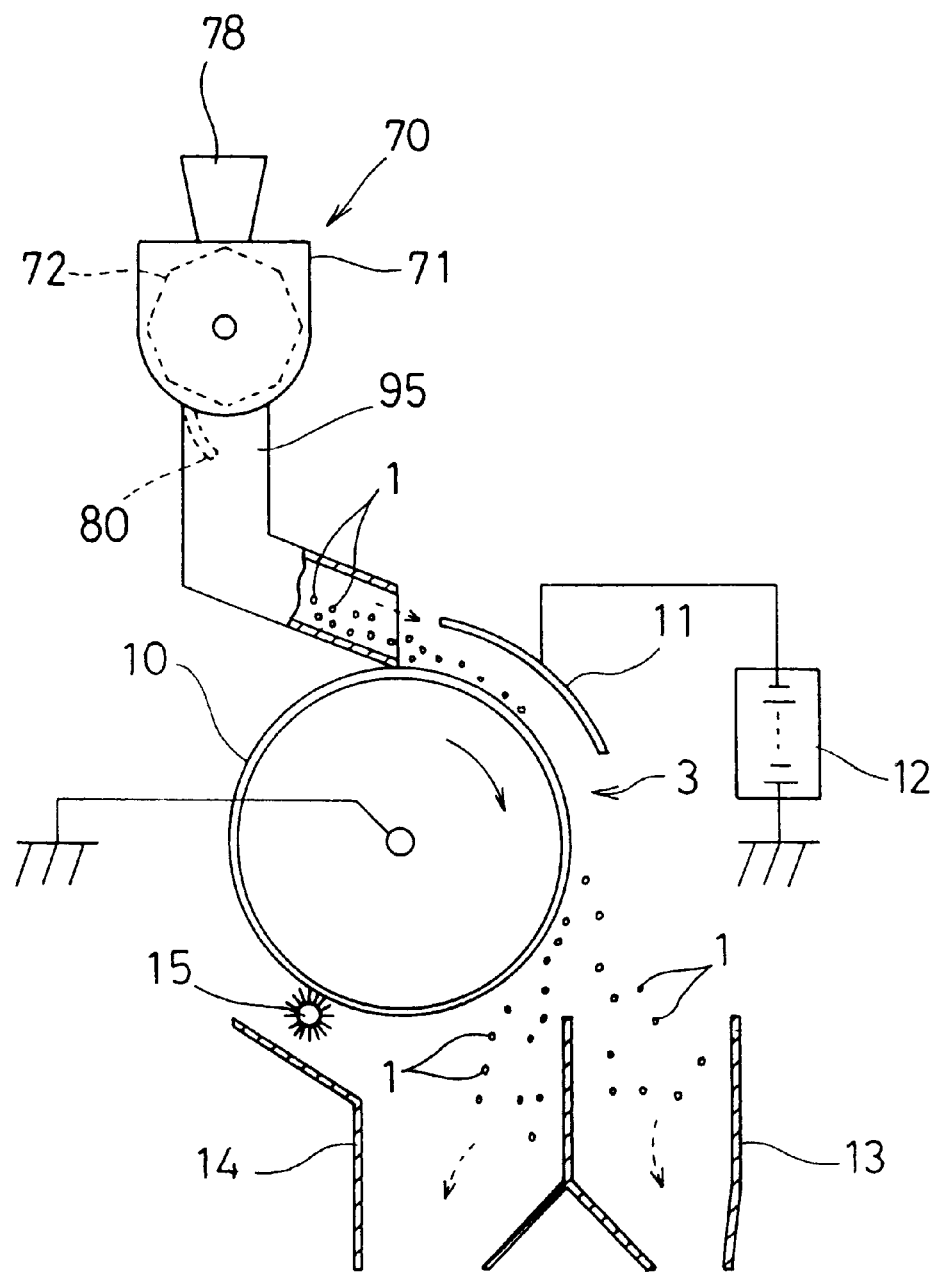
FIG. 12 is a schematic view showing said frictional charging device and electrostatic separator.

Further, the lower portion of said outer sleeve drum 73 is formed with a delivery port 79 (an example of a delivery portion) for delivering the plastic chips 1, delivered from the inner sleeve 72, to the outside of the outer sleeve 71. The plastic chips 1 delivered through the delivery port 79, as shown in FIG. 12, slide inside and down a feed tray 95 and are fed onto a metal drum electrode 10 of the electrostatic separator 3. The delivery port 79 is in elongated form, extending from the front end to the rear end of the outer sleeve drum 73 and is opened and closed by an opening/closing plate 80 turnably installed in the outer sleeve drum 73. In addition, the opening and closing operation of the opening/closing plate 80 is effected by a cylinder device (not shown).

The inner sleeve 72 is installed within the outer sleeve 71 for rotation around a horizontal axis 82 and is located at a vertical position between the loading port 77 and the delivery port 79. Further, the inner sleeve 72 comprises the inner sleeve main body 83 in the form of an octagonal sleeve, and end members 84 disposed on the front and rear ends of said inner sleeve main body 83. Further, the inner sleeve main body 83 comprises a plurality of frames 93 disposed in a direction along the horizontal axis 82, and net members 97 attached between these frames 93. Further, each of said end members 84 comprises a plurality of frames 94 radially extending from the horizontal axis 82, and a net member 97 attached to said frame members 94.

The net members 97 have a number of meshes 91 (an example of an opening) extending through the inner and outer sides of the inner sleeve 72. Further, the end members 84 on the front and rear sides are centrally provided with rotary shafts 85. These rotary shafts 85 are rotatably supported in the end plates 75 on the front and rear sides of the outer sleeve 71 through bearings 96. The front end of either of these front and rear rotary shafts 85 extends through said end plate 75 to the outside and is connected to a rotary driving device 86. The rotary driving device 86 comprises a motor 87 mounted outside the outer sleeve 71, pulleys 88 and 89, and a driving belt 90.

Further, the outer peripheral surface of the inner sleeve 72 is provided with a plurality of plate-like vane members 98 for scraping off plastic chips 1 collected between the outer and inner sleeves 71 and 72. These vane members 98 have a length that is substantially equal to the length of the inner sleeve 72 in the direction of the horizontal axis 82 and are four in all, attached to every second one of the eight apexes of the inner sleeve 72.

Figure 11:
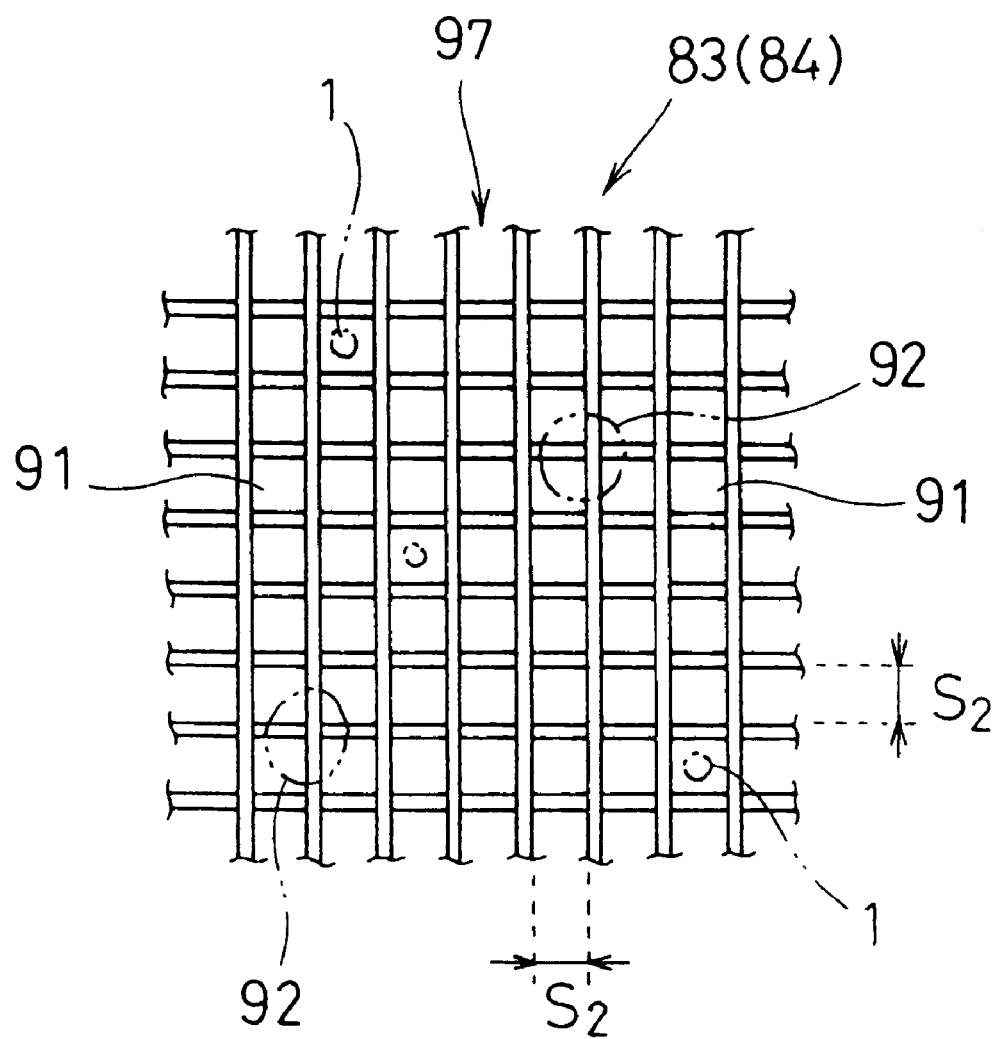
FIG. 11 is an enlarged view of a net member in the inner sleeve of said frictional charging device.

Further, as shown in FIG. 8, in order that chips 1 of a particular kind of plastic to be sorted out and plastic chips 1 having a reverse polarity to said chips 1 of said particular kind of plastic, in the electrification rank for a plurality of kinds of plastics forming the chips 1, may be equal in proportion to each other, particles of either of said plastics are put as a friction assisting material 92 in the inner sleeve 72. In addition, the particles of said friction assisting material 92 are so formed that they are larger than the chips 1 of said kinds of plastics. Further, as shown in FIG. 11, the spacing $S_2$ in each of the meshes 91 in the net members 97 of the inner sleeve 72 is set larger than the plastic chips 1 and smaller than the particles of the friction assisting material 92.

For example, in the case of a mixture of chips 1 of said kinds of plastics such as PVC, PE, PP, PS, these plastics may be arranged in order of electrification rank as PS→PE→PP→PVC. Here, PS is on the positive side of the electrification rank and PVC is on the negative side of the rank. In the case where, e.g., PVC is to be sorted out, if the amount of PVC is smaller than the total amount of PS and PE, particles of PVC are put as a friction assisting material 92 in the inner sleeve 72 such that the amount of PVC is equal to the total amount of PS and PE that are on the positive side of the electrification rank and have a reverse polarity to that of PVC. Further, on the contrary, if the amount of PVC is larger than the total amount of PS and PE, particles of PS and PE that have a reverse polarity to that of PVC, are put as a friction assisting material 92 in the inner sleeve 72. Thereby, the amount of PVC becomes equal to the total amount of PS and PE having a reverse polarity to that of PVC, so that PVC is sufficiently electrified in a short time to negative polarity, and hence PVC can be sorted out with high accuracy in the electrostatic separator 3.

The friction assisting material 92 selected in the manner described above is put in the inner sleeve 72 and while the inner sleeve 72 is being rotated by the rotary driving device 86, crushed plastic chips 1 are loaded into the loading hopper 78. In addition, at this time, the delivery port 79 has been closed by the opening/closing plate 80.

The plastic chips 1 loaded into the loading hopper 78, while falling, pass through the meshes 91 of the rotating inner sleeve 72 into the inner sleeve 72, where they are stirred. Thereby, the plastic chips 1 are rubbed against each other and against the friction assisting material 92, so that they are fully frictionally charged in a short time.

In addition, in the case where some of the plastic chips 1 loaded into the loading hopper 78 spill down the outer peripheral surface of the inner sleeve 72 to collect between the outer and inner sleeves 71 and 72, the plastic chips 1 spilled outside the inner sleeve 72 are scraped upward by the vane members 98 rotating integrally with the inner sleeve 72, thereby reliably passing through the meshes 91 to enter the inner sleeve 72. Further, the plastic chips 1 moving out of the inner sleeve 72 through the meshes 91 to the outside of the inner sleeve 72 are also repetitively scraped upward by the vane members 98, so that they again pass through the meshes 91 to enter the inner sleeve 72.

After the plastic chips 1 have thus been electrified for a given time, the opening/closing plate 80 is turned to open the delivery port 79. Thereby, the electrified plastic chips 1 are delivered from the inner sleeve 72 through the meshes 91 to the outside of the inner sleeve 72 and then to the outside of the outer sleeve 71 through the delivery port 79 while falling. At this time, the plastic chips 1 collected between the outer and inner sleeves 71 and 72 are pushed by the vane members 98 rotating integrally with the inner sleeve 72 and forcibly delivered from the delivery port 79. Therefore, the plastic chips 1 can be reliably delivered from the inner sleeve 71.

Further, since the friction assisting material 92 cannot pass through the meshes 91 of the net members 97 of the inner sleeve 72, it remains in the inner sleeve 72. Thereby, the friction assisting material 92 can be repetitively used.

Further, since the friction assisting material 92 rolls on the inner peripheral surface of the inner sleeve 72 owing to the rotation of the inner sleeve 72, it is possible to prevent the friction assisting material 92 from blocking the meshes 91 of the net members 97 of the inner sleeve 72. Therefore, the plastic chips 1 reliably pass through the meshes 91 of the inner sleeve 72 to be delivered from the inner sleeve 72 to the outside of the latter.

The plastic chips 1 thus delivered through the delivery port 79, fully charged, are fed as shown in FIG. 12 through the feed tray 95 onto the metal drum electrode 10 and sorted into two groups, one fed into the first separation vessels 13 and the other into the second separation vessel 14, according to kind.

In said embodiment 2, as shown in FIG. 9, since the many meshes 91 are formed in the entire surface (outer peripheral surface and opposite end surfaces) of the inner sleeve 72, the loading and delivery of the plastic chips 1 are effected through the entire surface of the inner sleeve 72. Therefore, even if clogging of some meshes 91 should locally occur in the inner sleeve 72, the plastic chips 1 pass through the other meshes 91, so that almost no trouble occurs.

In said embodiment 2, as shown in FIG. 8, the inner sleeve 72 is positioned between the upper loading port 77 and the lower delivery port 79, utilizing the falling of the plastic chips 1 for loading and delivering the plastic chips 1; therefore, the loading and delivering of the plastic chips 1 can be smoothly effected.

In said embodiment 2, when the inner sleeve 72 is rotating to stir the plastic chips 1, the delivery port 79 is kept closed by the opening/closing plate 80 for the time required for sufficient stirring. This prevents the situation in which the plastic chips 1 are delivered though the delivery port 79 in the state of not being sufficiently electrified.

In said embodiment 2, in the case of sorting, for example, PVC from the chips 1 of a plurality of kinds of plastics such as PVC, PE, PP and PS, particles of PVC or particles of PS and PE that are on the positive side of the electrification rank are used as the friction assisting material 92 according to the PVC content. However, the same effect may also be obtained by using particles of PP that is located intermediate in the electrification rank, as a friction assisting material 92. Further, particles of a metal such as stainless steel, may be used as the friction assisting material 92.

In said embodiment 2, the plastic chips 1 in the inner sleeve 72 can be thoroughly stirred by rotating the inner sleeve 72. Further, the inner sleeve 72 may be internally provided with bar-like or vane-like stirring members to ensure more reliable stirring.

In said embodiment 2, as shown in FIG. 8, the inner sleeve main body 83 of the inner sleeve 72 is in the form of an octagonal sleeve; however, it may be a polygonal, other than octagonal, sleeve or a circular sleeve.

In said embodiment 2, as shown in FIG. 8, four vane members 98 are attached to the inner sleeve 72, but the number is not limited to four, and a single or a plurality of, other than four, vane members may be attached thereto. For example, eight vane members 98 may each be attached to one of the eight apexes of the inner sleeve 72.

In said embodiment 2, as shown in FIG. 9, the position at which the loading port 77 and loading hopper 78 are attached may be a longitudinal end or intermediate position on the roof plate 74 of the outer sleeve 71. Further, as in the case of the delivery port 79, the loading port 77 and loading hopper 78 may be in elongated form, extending from the front end to the rear end of the roof plate 74.

Figure 13:
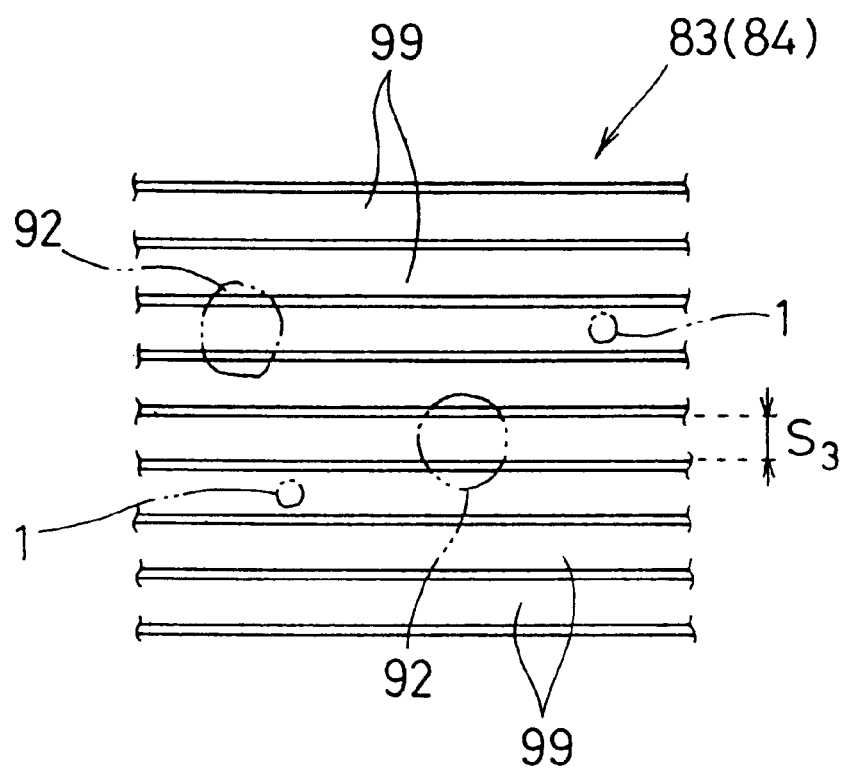
FIG. 13 is an enlarged view of the slits in the inner sleeve of a frictional charging device according to an embodiment 3 of the invention.
Figure 14:
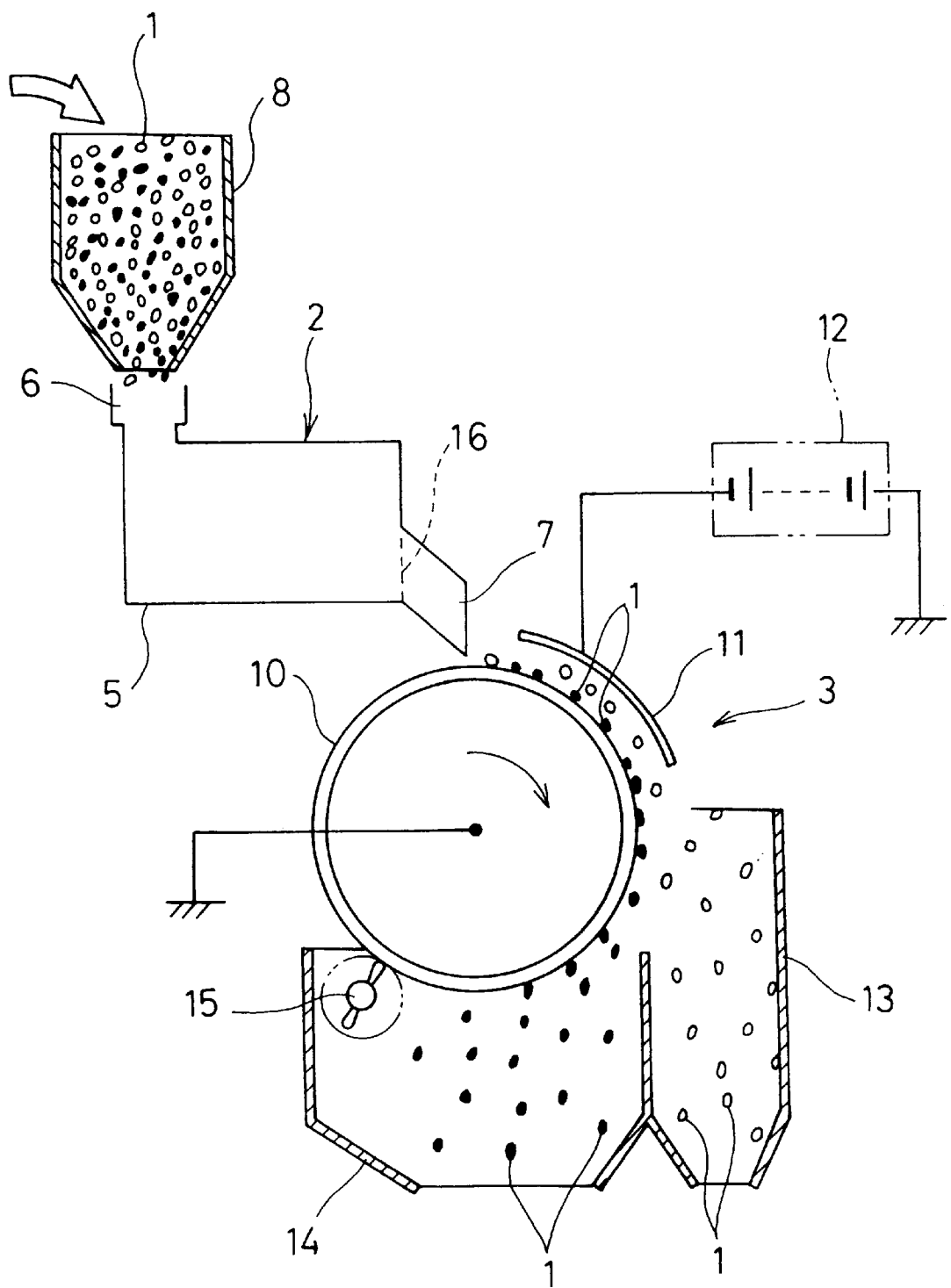
FIG. 14 is a schematic view showing a conventional frictional charging device and a conventional electrostatic separator.
Figure 15:
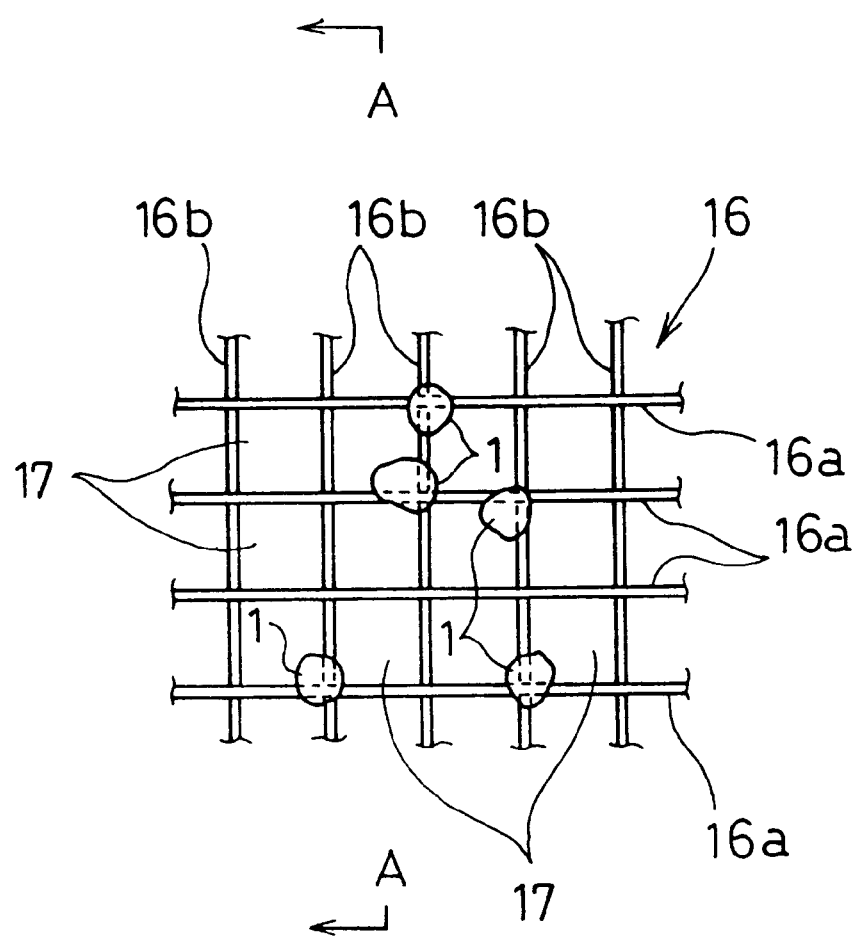
FIG. 15 is an enlarged front view of a net member installed in the delivery port of said conventional frictional charging device.
Figure 16:
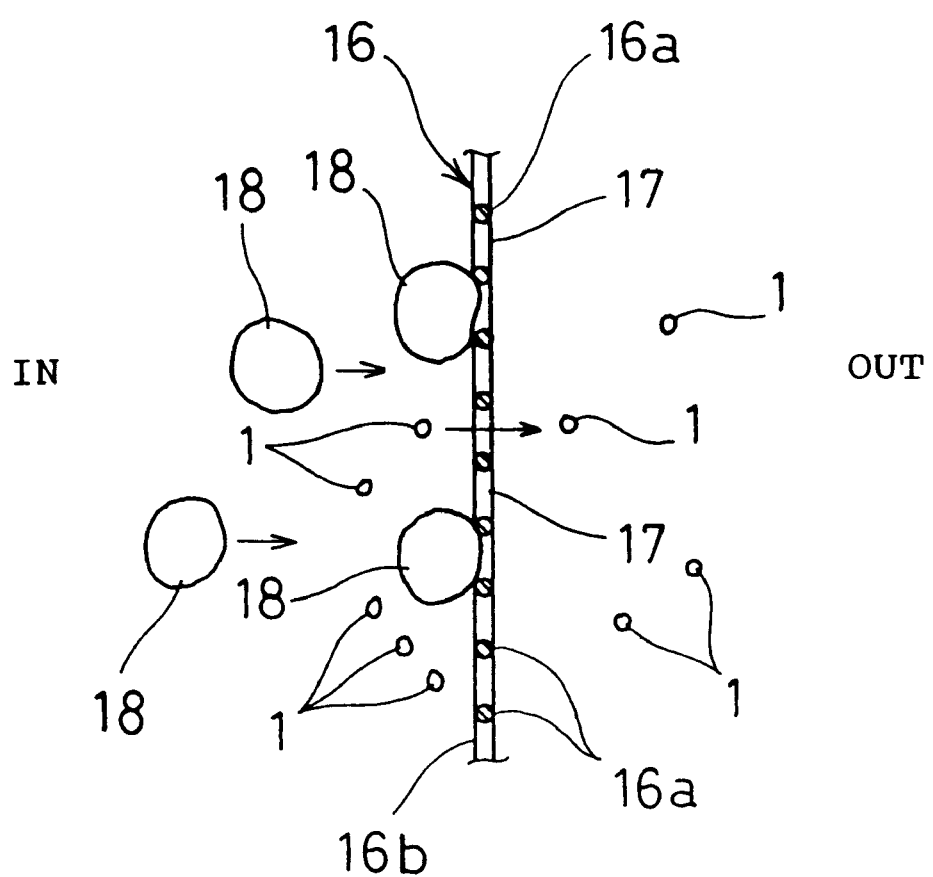
FIG. 16 is a view taken along the line A—A in FIG. 15.

In said embodiment 2, as an example of an opening formed in the inner sleeve 72, there is cited, as shown in FIG. 11, meshes 91 in the net members 97 formed of wires in an orthogonal cross pattern. In contrast thereto, as an embodiment 3, as shown in FIG. 13 a number of wires or bars may be arranged to extend in one direction at predetermined intervals and parallel to each other to form a number of slits 99 (an example of an opening). In this case, the spacing $S_3$ between these slits 99 is set larger than the plastic chips 1 and smaller than the particles of the friction assisting material 92.

INDUSTRIAL APPLICABILITY

As described above, the frictional charging device according to the invention is suitable for repetitively using a friction assisting material when chips of a plurality of kinds of plastics are to be stirred for electrification.

What is claimed is:

1. A frictional charging device that charges crushed chips of a plurality of kinds of plastics by stirring them and feeds them to an electrostatic separator used for sorting, said frictional charging device being characterized in that said device is provided with a stirring vessel rotatable around its axis, and a rotary driving device for rotating said stirring vessel, said stirring vessel having a loading port formed at one end thereof for loading plastic chips, said stirring vessel having a delivery port formed at the other end thereof for delivering charged plastic chips, said delivery port being provided with a plurality of delivery area wires arranged along the cross-section of the stirring vessel, at predetermined intervals and parallel to each other, wherein in order that chips of a particular kind of plastic to be sorted out and plastic chips having a positive or negative polarity reverse to that of said chips of said particular kind of plastic, in the electrification rank for said kinds of plastics forming the chips, may be equal in proportion to each other, particles of either of said plastics are put as a friction assisting material in the stirring vessel, the particles of said friction assisting material being so formed that they are larger than the plastic chips, the spacing between said delivery area wires being set larger than the plastic chips and smaller than the particles of the friction assisting material.

2. A frictional charging device as set forth in claim 1, characterized in that disposed intermediate between the loading port and the delivery port are a plurality of intermediate wires arranged along the cross-section of the stirring vessel, at predetermined intervals and parallel to each other, the spacing between said intermediate wires being set larger than the plastic chips and smaller than the particles of the friction assisting material, the delivery area wires and the intermediate wires differing from each other in direction peripherally of the stirring vessel.

3. A frictional charging device as set forth in claim 1, characterized in that the stirring vessel is inclined such that the delivery port side is positioned below the level of the loading port side.

4. A frictional charging device as set forth in claim 1, characterized by including a delivery area adjuster for adjusting the area of the opening in the delivery port.

5. A frictional charging device as set forth in claim 1, characterized by including a stirring member disposed in the stirring vessel for stirring the plastic chips.

6. A frictional charging device that charges crushed chips of a plurality of kinds of plastics by stirring them and feeds them to an electrostatic separator used for sorting, said frictional charging device being characterized in that an inner sleeve having a number of openings extending therethrough is rotatably installed inside an outer sleeve, said outer sleeve being provided with a loading port for loading plastic chips into the outer sleeve, and a delivery port for delivering the plastic chips, delivered from the inside of the inner sleeve, to the outside of the outer sleeve, wherein in order that chips of a particular kind of plastic to be sorted out and plastic chips having a positive or negative polarity reverse to that of said chips of said particular kind of plastic, in the electrification rank for a plurality of kinds of plastics forming the chips, may be equal in proportion to each other, particles of either of said plastics are put as a friction assisting material in the inner sleeve, the particles of said friction assisting material being so formed that they are larger than the plastic chips, the openings in said inner sleeve being formed to be larger than the plastic chips and smaller than the particles of the friction assisting material.

7. A frictional charging device as set forth in claim 6, characterized in that the inner sleeve is rotatable around a horizontal axis, the loading portion is formed in the upper region of the outer sleeve, while the delivery portion is formed in the lower region of the outer sleeve, and said inner sleeve is located at a vertical position between the loading portion and the delivery portion.

8. A frictional charging device as set forth in claim 6, characterized in that the inner sleeve is composed of an inner sleeve main body shaped like a sleeve, and end members for closing opposite ends of said inner sleeve main body, and said inner sleeve main body and said end members are respectively formed with a number of openings.

* * * * *